(12) United States Patent
Keady

(10) Patent No.: US 6,769,333 B2
(45) Date of Patent: Aug. 3, 2004

(54) WHEEL NUT LOOSENING AND TIGHTENING DEVICE

(76) Inventor: John Raymond Keady, 395 Gold Creek Road, Eumundi, Queensland, 4562 (AU)

(*) Notice: Subject to any disclaimer, the term of this patent is extended or adjusted under 35 U.S.C. 154(b) by 0 days.

(21) Appl. No.: 10/204,414

(22) PCT Filed: Mar. 9, 2001

(86) PCT No.: PCT/AU01/00251
§ 371 (c)(1),
(2), (4) Date: Aug. 28, 2002

(87) PCT Pub. No.: WO01/68325
PCT Pub. Date: Sep. 20, 2001

(65) Prior Publication Data
US 2003/0010161 A1 Jan. 16, 2003

(30) Foreign Application Priority Data
Mar. 10, 2000 (AU) .............................................. PQ6172

(51) Int. Cl.[7] .............................................. B25B 23/00
(52) U.S. Cl. ..................................... 81/462; 81/180.1
(58) Field of Search ............................... 81/462, 180.1

(56) References Cited

U.S. PATENT DOCUMENTS

| | | | | |
|---|---|---|---|---|
| 2,960,895 A | * | 11/1960 | Richards | 81/462 |
| 3,069,945 A | * | 12/1962 | Shandel | 81/462 |
| 3,097,550 A | * | 7/1963 | Johnston | 81/462 |
| 3,158,050 A | * | 11/1964 | Shandel | 173/93 |
| 3,730,027 A | * | 5/1973 | Rohn | 81/462 |
| 3,832,917 A | * | 9/1974 | Feith | 81/462 |
| 4,619,161 A | * | 10/1986 | Reynolds | 81/462 |
| 4,620,462 A | * | 11/1986 | Parker | 81/462 |
| 4,625,600 A | * | 12/1986 | Koren et al. | 81/462 |
| 4,660,447 A | * | 4/1987 | Rossi | 81/462 |
| 4,972,742 A | * | 11/1990 | Brown | 81/462 |
| 5,018,413 A | * | 5/1991 | Vazquez | 81/462 |
| 5,263,392 A | * | 11/1993 | Schoen | 81/462 |
| 5,431,074 A | * | 7/1995 | Durante | 81/462 |
| 5,613,411 A | * | 3/1997 | Rines | 81/462 |
| 5,967,005 A | * | 10/1999 | DeVore et al. | 81/462 |
| 6,041,681 A | * | 3/2000 | Griffin, Sr. | 81/462 |

FOREIGN PATENT DOCUMENTS

| | | | | |
|---|---|---|---|---|
| AU | 14437/83 A | 11/1982 | | |
| AU | 72607/87 A | 11/1987 | | |
| AU | 47639/90 A | 7/1990 | | |
| AU | 86877/91 A | 5/1992 | | |
| AU | 75965/94 B | 5/1995 | | |
| AU | 9475965 | * | 5/1995 | .......... B25B/23/00 |
| AU | 71853/96 A | 5/1998 | | |
| DE | 2751730 A | 5/1979 | | |
| FR | 2581592 A | 11/1986 | | |
| GB | 2167716 A | 6/1986 | | |
| GB | 2237779 A | 5/1991 | | |
| GB | 2241456 A | * | 9/1991 | .......... B25B/13/48 |

* cited by examiner

Primary Examiner—Joseph J. Hail, III
Assistant Examiner—David B. Thomas
(74) Attorney, Agent, or Firm—Hoffman Wasson & Gitler, PC

(57) ABSTRACT

A device for use in combination with a wheel brace for loosening or tightening the wheel nuts of vehicles which provides a significant mechanical advantage without deformation of the brace arm. The ground engaging support has projections for supporting a socket extension horizontally. The developed lever has collars which capture a sliding bar of the socket extension and enable maximum torque to be applied through point "p" when the developed lever is rotated in the direction "x".

19 Claims, 3 Drawing Sheets

WHEEL NUT LOOSENING AND TIGHTENING DEVICE

BACKGROUND OF THE INVENTION

The present invention relates to a device for assisting the loosening or tightening of nuts, and is particularly concerned with a device for loosening or tightening of wheel nuts on automobiles, trucks, trailers, agricultural machinery and like vehicles.

Wheel nuts are notorious for locking up and being difficult to undo. This can be due to over-tightening in the first place, corrosion-binding to the stem or, more frequently, due to the rotation of the wheel in use which has a tightening effect.

DESCRIPTION OF THE PRIOR ART

Various tools have been developed to loosen wheel nuts, ranging from the common 120° "L-shaped" wheel brace used primarily for wheel nuts of small vehicles through the four-way or X-brace to more sophisticated lever arrangements for larger vehicles.

Tools used to loosen wheel nuts on large vehicles such as trucks are generally quite different from those used to loosen wheel nuts on automobiles because of the larger wheels, larger nuts and substantially higher torque which has to be applied. A type of tool commonly used for trucks comprises a socket extension and a sliding T-bar. The socket extension is merely a rod with a socket coupling at one end enabling connection with the nut (which is often set back some distance from the outer rim of the wheel) and another socket coupling at the other end for connection to a housing on the sliding T-bar. The sliding T-bar is simply a lever with a housing which slides along it. The housing, which is typically of caste metal construction, has a portion which is adapted to slot into the socket coupling of the socket extension. This tool has the disadvantage that for wheel nuts which are locked very tight, the lever frequently bends adjacent the housing and the wheel nut cannot be easily removed.

The problem with tools such as braces provided with most automobiles is that they can be difficult for many people to apply the necessary torque to the nuts for removal. This is particularly the case for many women, the disabled and the elderly. For instance a typical "L-shaped" wheel brace supplied with most automobiles today is a small device having a socket designed to fit about the wheel nut, an elbow located within about 20 mm from a closed end of the socket, and an arm extending approximately 20 mm from the elbow. As noted above, there is typically an angle of approximately 120° between the arm and an axis of the socket. To use such a wheel brace it is essential for the user to support the elbow of the wheel brace with one hand, whilst attempting to rotate the socket by pressing up or down on the shaft with the other hand. As a result, the torque that can be applied in attempting to loosen the wheel nut is limited to the torque which can be produced by the application of the force of one hand to the arm of the brace. This is frequently insufficient to loosen the nut and the user will then use both hands to apply force to the arm of the brace. However, having taken one hand off the brace's elbow, the socket tends to slip off the wheel nut since the force applied to the arm creates a second torque which is in the plane of the axis of the socket. The result of all this is that the wheel nut becomes frustratingly difficult to loosen.

OBJECT OF THE INVENTION

It is therefore an object of the invention to address these problems by providing a device which has a useful mechanical advantage to enable effective loosening, and tightening of wheel nuts and/or which at least provides the public with a useful alternative to existing products.

SUMMARY OF THE INVENTION

According to the present invention there is provided a device for assisting the loosening of wheel nuts comprising a ground-engaging wheel brace support and a developed lever, wherein (i) said ground engaging wheel brace support comprises a vertically extending element having a plurality of projections between its end for supporting a wheel brace in a substantially horizontal arrangement with respect to a wheel nut to be loosened, and (ii) said developed lever includes means to capture and hold the wheel brace in such a way that the application of a downward force on the end of the developed lever is transmitted over a substantial section of the wheel brace to increase the rotational torque on the nut while minimising the tendency of the brace to bend.

The term "wheel brace" need throughout the specification and claims is intended to encompass all conventional devices for loosening and tightening wheel nuts, such as cross-braces, "L-shaped" wheel braces, socket extensions, and so forth.

DETAILED DESCRIPTION OF THE INVENTION

The ground-engaging wheel brace support is preferably fabricated from a strip of steel plate which is contoured for maximum strength and stability, and which has a series of cut-out sections formed along its length for accepting and supporting a section of the wheel brace. Typically, the wheel brace support has two series of cut-out sections formed along its entire opposing edges, wherein each series of cut-out sections along one edge is regularly spaced but stepped in relation to the cut-out sections along the opposing edge. Preferably, the cut-out sections will have inclined openings so that the brace which projects therein will not slide out. The cut-out sections define the projections on which the brace rests.

A base plate, such as a small pad can project perpendicularly from the lower, in use, end of the upright stand or support, to enable proper contact with the ground, or surface on which the vehicle is resting and to ensure that the upright stand or support is maintained in a substantially vertical orientation when in use. Such a base plate is preferably formed integrally with the upright stand or support.

The developed lever is suitably at least twice as long as the wheel brace arm to which it is fitted. Preferably, the length of the developed lever is about 3 or 4 times the length of the wheel brace arm. Since such a length would normally result in an unwieldy lever for stowage purposes, a telescopic arrangement is preferred.

Most preferably, the developed lever comprises a hollow steel tube having a square or circular profile, with a smaller diameter tube slidable therein and extendable to a maximum extent governed by a spring loaded indent which extends from the interior of the smaller diameter tube through an opening near the end of the larger diameter tube when at maximum permitted extension.

The means for capturing and holding the wheel brace on the developed lever will be determined by the specific type of wheel brace to be used. For large vehicles such as trucks and agricultural equipment, a socket extension wheel brace with a sliding T-bar is typically employed. In that case, the capturing and holding means will preferably comprise a first collar adjacent one end of the developed lever and a second collar spaced from the first collar by a distance enabling capture of the sliding T-bar therein. The arrangement is such that force is transmitted to the sliding T-bar at the points of support in the first and second collars and through the housing in which the sliding T-bar connects with the socket extension. This effectively distributes the force applied to the T-bar and mitigates the bending thereof.

The first collar can comprise a ring, square or round tube section which is either welded to the developed lever or, more preferably, fitted to the developed lever by means of a threaded stem which passes through opposing walls of the developed lever and which can be tightened or loosened by means of a wing nut or the like. This arrangement enables the T-bar housing of a socket extension to be accommodated below the developed lever while the T-bar is retained in a substantially parallel relationship with the developed lever.

The second collar can also comprise a ring, square or round tube section but this is preferably welded to the developed lever at a position between one third and one half the length of the non-extended developed lever measured from the first collar. The second collar has internal dimensions which are greater than the cross-sectional dimension of the T-bar and for this reason a spring-clip, or threaded stem can be provided to ensure that the T-bar is firmly held by the developed lever.

In one embodiment, the developed lever for use with a socket extension wheel brace incorporates a metal band on the side opposing the side on which the collars are located. The band is welded near each end of the developed lever and curves outwardly from a mid region of the developed lever. It is supported in a raised elevation by a small plate extending perpendicular to the developed lever which is located directly opposite the second collar. The purpose of this metal band is twofold. Firstly it resists the bending of the developed lever under the application of force applied to the lever during operation. Secondly it dampens the recoil of the developed lever when a nut is suddenly loosened.

As noted previously, the capturing and holding means depends on the type of wheel brace used. For small vehicles such as automobiles, which employ cross-braces or "L-shaped" wheel braces, the capturing and holding means will suitably comprise a pair of spaced brace supports extending, respectively, perpendicularly from one end of the developed lever and a shortened distance therefrom, which retain a brace arm in parallel spaced relationship with the developed lever and prevent lateral movement thereof. Suitably, a brace support on the end of the developed lever comprises a recessed plate welded over the end of the developed lever from which it projects. The recessed plate has turned down projecting ends so that the arm of a cross-brace extending at right angles to the developed lever can be retained in situ.

The brace support which is spaced from the end of the developed lever also preferable comprises a recessed plate but which is welded about the body of the developed lever.

In use, the ground engaging wheel brace support is placed in a vertical position parallel to the wheel ensuring that it is on stable level ground and will not slip or sink. The socket of a socket bar (in the case of large vehicles) is placed on a selected wheel nut and the socket bar is located on one of the projections of the wheel brace support so that the socket bar is maintained in a substantially horizontal arrangement. The socket extension is then fitted into the housing of the sliding T-bar and the developed lever is connected to the sliding T-bar through its collars so that the developed lever extends over the sliding T-bar and the housing on the T-bar is adjacent to the first collar. The inner extendable tube of the developed lever is then extended to its required length. The developed lever rests on the T-bar housing and upon the extendable tube being manually depressed at its outer free end, transmits all the energy of rotation to the socket extension, enabling a maximum torque to be applied to the nut with less energy than would normally be required, to thereby loosen the nut. Further, because of the location of the collars on the developed lever, there is no one point of the sliding T-bar which is overly stressed; in effect the energy of rotation is dissipated along the entire length of the T-bar to the housing, thereby avoiding any bending of the T-bar as was previously the case.

Operation of the developed lever adapted for use for smaller vehicles such as automobiles is by an entirely analogous procedure to that defined above.

DESCRIPTION OF PREFERRED EMBODIMENTS

Preferred embodiments of the invention will now be described with reference to the accompanying drawings, in all of which like referenced numerals refer to like parts.

Figure 1:
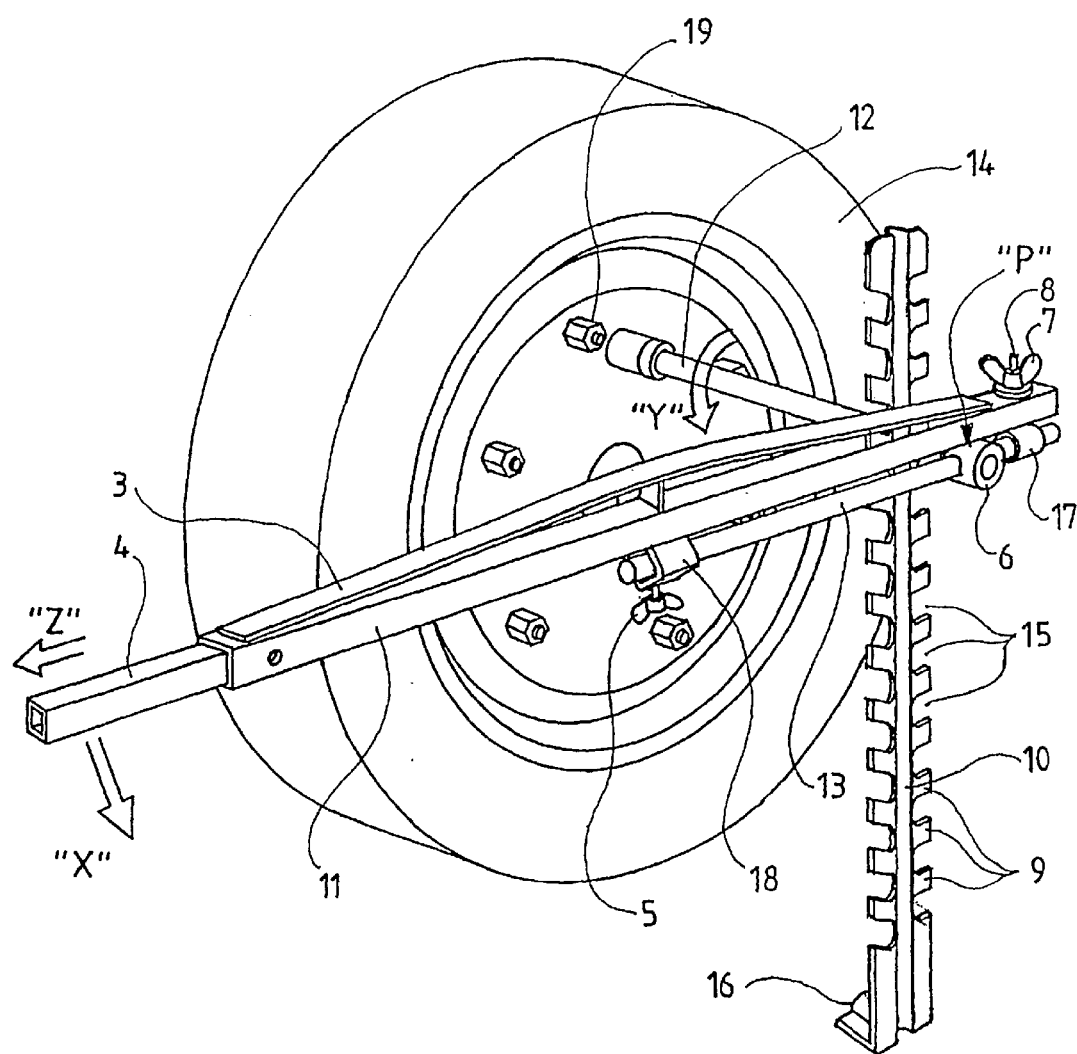
FIG. 1 is a perspective view of a device according to one aspect of the present invention.

Referring firstly to FIG. 1, the device comprises a ground engaging wheel brace support 10 and a developed lever 11, shown in an in use configuration with a socket extension 12 and a sliding T-bar 13, with an adjacent wheel 14 of a vehicle.

The ground engaging wheel brace support 10 has a plurality of cut-out sections 15 formed down each side in a staggered relationship which define brace supporting projections 9. An integrally formed base 16 projects perpendicularly from the lower end of the upright support to provide purchase with the ground and to retain the wheel brace support in a substantially vertical position.

The socket extension 12 is supported by a selected one of the projections 9 to ensure that it is maintained in a substantially horizontal arrangement, that is, perpendicular to the wheel brace support 10.

The developed lever 11 rests on top of the sliding T-bar 13 at the pivot point "P" and is retained by the sliding T-bar by a first collar 17 and a second collar 18. The first collar 17 has a threaded stem 8 and a wing nut 7 which enables the housing 6 for the sliding T-bar 13 to be firmly retained against the developed lever 11. The second collar 18 has a threaded stem which enables the sliding T-bar 13 to be held in situ.

An inner tube 4 is extendable in the direction of arrow "Z" to enable greater leverage to be applied by the developed lever 11.

A metal band 3 is welded to the upper surface of the developed lever to resist bending of the developed lever and to dampen recoil of the developed lever when a nut is suddenly loosened.

Movement of the developed lever 11 manually in the direction "X" enables all the force to be translated into rotational force at the pivot point "P" to the socket extension 12, causing the socket extension to rotate in the direction "Y" and loosen the associated nut 19.

Figure 2:
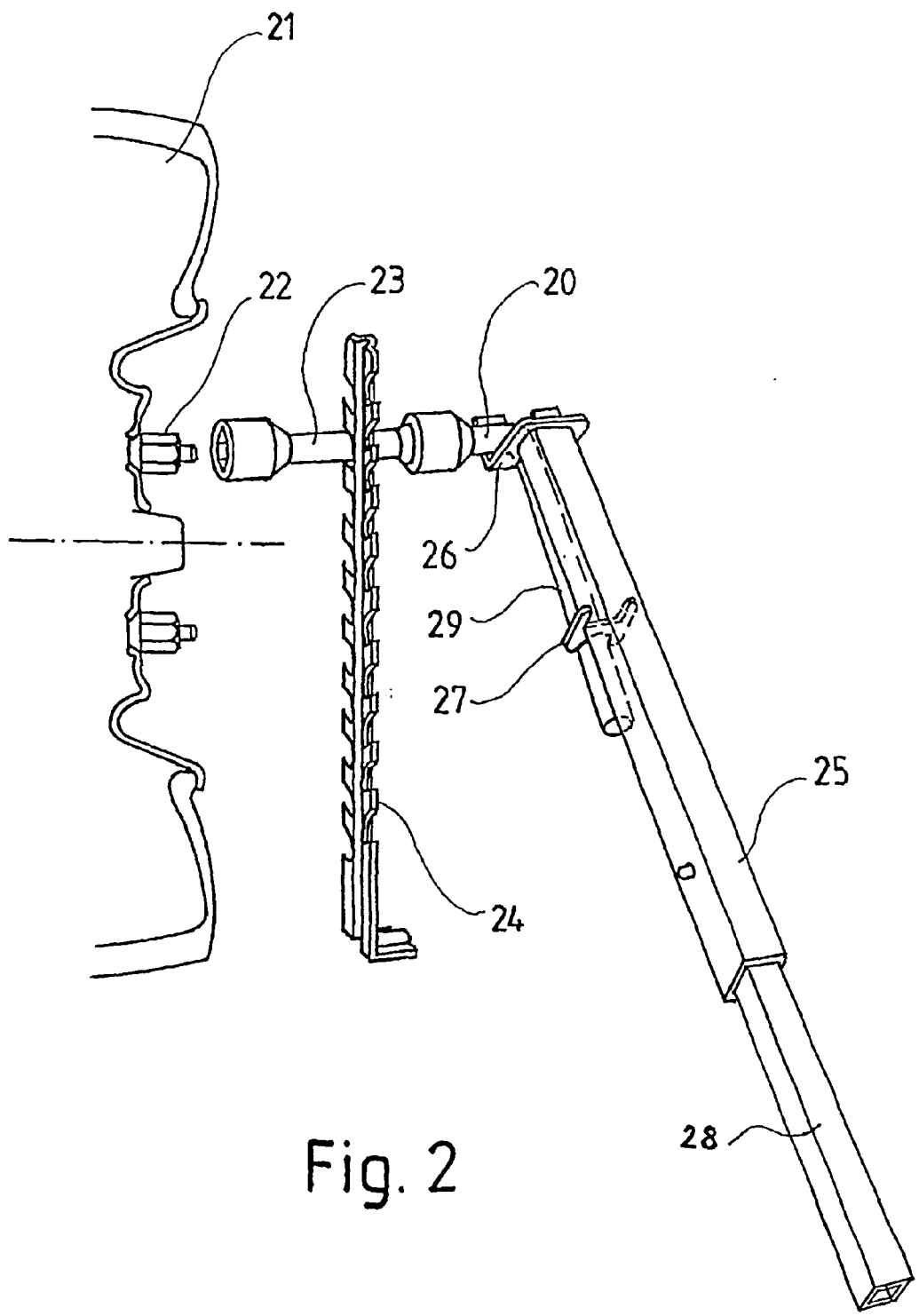
FIG. 2 is a perspective view of a device according to another aspect of the present invention.

FIG. 2 is essentially a partial side-on perspective of a device for use with automobiles having a conventional 120° "L-shaped" wheel brace 20. The drawing shows a partial cross-section of a wheel 21, a nut 22 to be loosened, a socket extension 23, an upright stand 24 and a developed lever 25.

The socket extension 23 is a smaller version of the socket extension 12 described in the previous embodiment.

The upright stand 24 is likewise a smaller version of the upright support 10 described in the previous embodiment.

The developed lever 25 differs from the developed lever 11 of the previous embodiment in that it is smaller and instead of having collars, it has a recessed plate support member 26 at its terminal end and a recessed plate 27 spaced therefrom. The recessed plates 26, 27 enable capture of the brace 20 for rotation of the brace below the developed lever. An extension piece 28, is longitudinally slidable with respect to the housing of the developed lever 25.

This arrangement allows the applied force to be transmitted right along the major arm portion 29 of the wheel brace 20 so that maximum torque can be applied to the socket extension and thence to the nut 22 to facilitate the loosening thereof.

Figure 3:
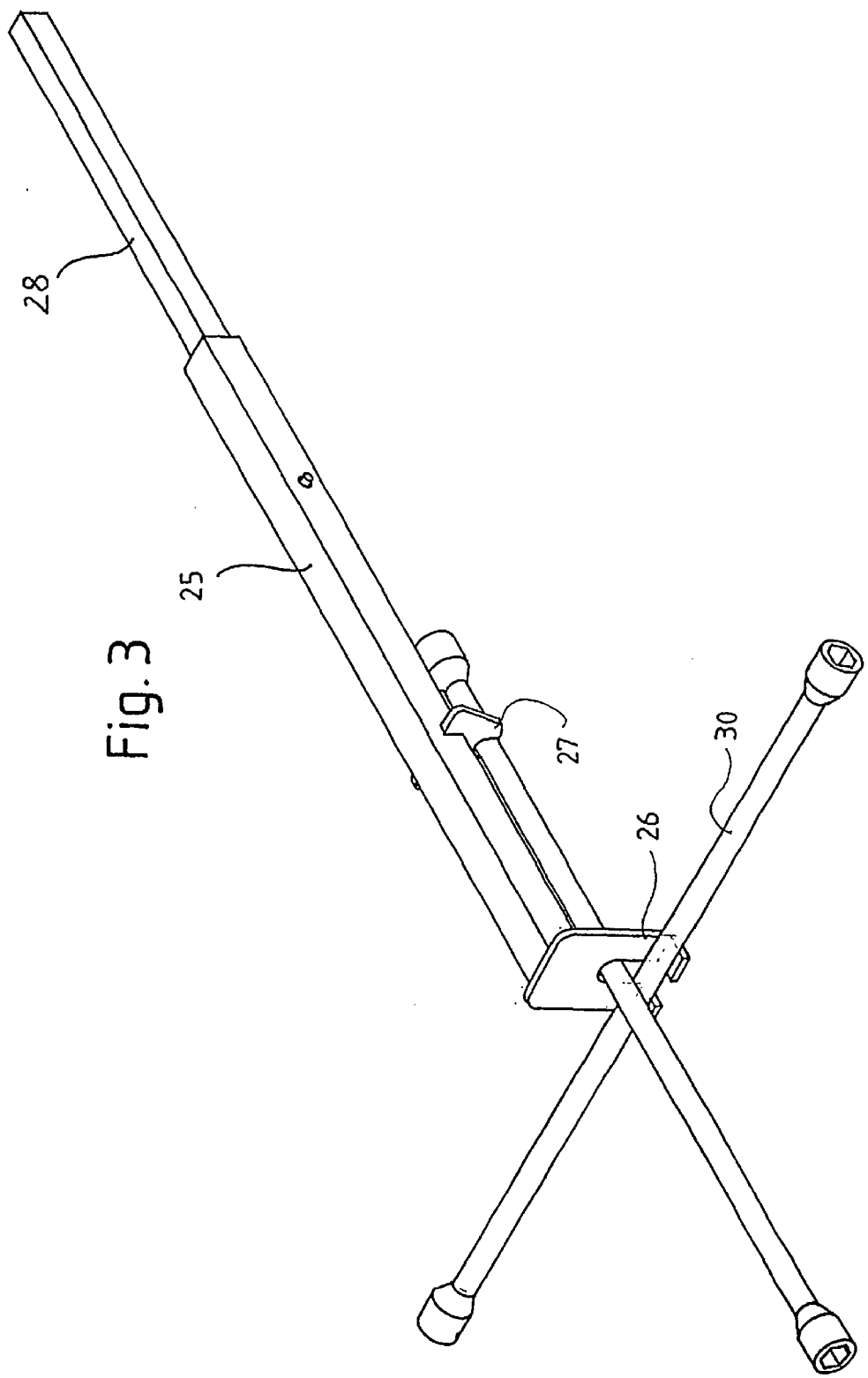
FIG. 3 is a side perspective view of the developed lever depicted in FIG. 2 but used with a different tool.

FIG. 3 shows the same developed lever 25 as shown in FIG. 2. The drawing however depicts how a cross-brace 30 can be supported by the lever for use in loosening nuts, primarily on automobiles, using an arrangement as depicted in FIG. 2.

Testing of the effectiveness of the device depicted in FIG. 1 was carried out by the Department of Civil Engineering of the University of Queensland, St Lucia, Queensland, Australia. The tests were carried out in a torsion testing machine and gave the following results:

| Test torque (N-m) | Foot pounds force (ftlbf) | Force at end of extension bar to produce required torque (kg/f) |
| --- | --- | --- |
| 678 | 500 | 39 |
| 813 | 600 | 48 |
| 950 | 700 | 58 |
| 1060 | 782 | Bolt stretching and force could not be measured |

It can be seen from above that the invention provides a very useful means for facilitating the removal of nuts from wheels and meets the original objectives set forth in the preamble.

Whilst the above has been given by way of illustrative example of the invention, many modifications and variations may be made thereto by persons skilled in the art without departing from the broad scope and ambit of the invention as herein set forth.

What is claimed is:

1. A device for assisting the loosening of wheel nuts comprising a ground-engaging wheel brace support and a developed lever, wherein
   (i) said around engaging wheel brace support comprises a vertically extending element having a plurality of projections between its ends for supporting a wheel brace in a substantially horizontal arrangement with respect to a wheel nut to be loosened, and
   (ii) said developed lever includes means to capture and hold the wheel brace in such a way that application of a downward force on the end of the developed lever increases the rotational torque on the nut while minimising the tendency of the brace to bend wherein the means to capture and hold the wheel brace comprises the combination of a first collar adjacent one end of the developed lever and a mutually aligned second collar spaced from the first collar, wherein the wheel brace can span between the two collars.

2. A device for assisting the loosening of wheel nuts as claimed in claim 1, wherein the developed lever comprises a hollow tube with a smaller diameter tube slidable therein to extend the length of the developed lever to a predetermined maximum length.

3. A device for assisting the loosening of wheel nuts as claimed in claim 1, wherein the first collar comprises a round tubular section which is fitted to the developed lever by means of a threaded stem which passes through opposing walls of the developed lever and which can be tightened, or loosened, by a locking nut.

4. A device for assisting the loosening of wheel nuts as claimed in claim 1, wherein the second collar comprises a square tubular section welded to the developed lever at a location which is between approximately one third and one half the length of the non-extended developed lever measured from the location of the first collar; said second collar having associated fixing means to enable the wheel brace to be fixed to the second collar.

5. A device for assisting the loosening of wheel nuts as claimed in claim 1, wherein the developed lever includes a metal band welded at each end to a side of the developed lever opposing the side on which the wheel brace capturing and holding means is fitted.

6. A device for assisting the loosening of wheel nuts as claimed in claim 5, wherein the metal band curves outwardly from the developed lever and is supported in such a configuration by a plate extending perpendicularly to the developed lever.

7. A device for assisting the loosening of wheel nuts as claimed in claim 1, wherein the first collar comprises the combination of a pair of brace supports extending perpendicularly from one end of the developed lever.

8. A device for assisting the loosening of wheel nuts as claimed in claim 7, wherein the brace support on the end of the developed lever comprises a recessed plate welded over the end of the developed plate, said recessed plate having turned down ends so that the arms of a cross-brace extending at right angles to the developed lever can be retained in situ.

9. A device for assisting the loosening of wheel nuts as claimed in claim 1, wherein the first collar adjacent one end of the developed lever and the mutually aligned second collar spaced from the first collar is spaced whereby a socket extension is disposed between said first and second collars.

10. A device for assisting the loosening of wheel nuts comprising a ground-engaging wheel brace support and a developed lever, wherein
   (i) said ground engaging wheel brace support comprises a vertically extending element having a plurality of projections between its end for supporting a wheel brace in a substantially horizontal arrangement with respect to a wheel nut to be loosened, and
   (ii) said developed lever includes means to capture and hold the wheel brace in such a way that application of a downward force on the end of the developed lever increases the rotational torque on the nut while minimising the tendency of the brace to bend wherein the means to capture and hold the wheel brace comprises the combination of a first collar adjacent a rest wherein the first collar and the rest are disposed adjacent one end of the developed lever.

11. A device for assisting the loosening of wheel nuts as claimed in claim 10, wherein the first collar comprises a round tubular section which is fitted to the developed lever by means of a threaded stem which passes through opposing walls of the developed lever and which can be tightened, or loosened, by a locking nut.

12. A device for assisting the loosening of wheel nuts as claimed in claim 10, wherein developed lever further comprises a second collar positioned to retain the end of the wheel brace remote from the first collar.

13. A device for assisting the loosening of wheel nuts as claimed in claim 12, wherein second collar comprises a square tubular section welded to the developed lever at a location which is between approximately one third and one half the length of the non-extended developed lever measured from the location of the first collar; said second collar having associated fixing means to enable the wheel brace to be fixed to the second collar.

14. A device for assisting the loosening of wheel nuts as claimed in claim 10, wherein the developed lever includes a metal band welded at each end to a side of the developed lever opposite the side on which the wheel brace capturing and holding means is fitted.

15. A device for assisting the loosening of wheel nuts as claimed in claim 14, wherein the metal band curves outwardly from the developed lever and is supported in such a configuration by a plate extending perpendicularly to the developed lever.

16. A device for assisting the loosening of wheel nuts as claimed in claim 10, wherein the first collar comprises a pair of brace supports extending perpendicularly from one end of the developed lever.

17. A device for assisting the loosening of wheel nuts as claimed in claim 16, wherein the brace support on the end of the developed lever comprises a recessed plate welded over the end of the developed plate, said recessed plate having turned down ends so that the arms of a cross-brace extending at right angles to the developed lever can be retained in situ.

18. A device for assisting the loosening of wheel nuts as claimed in claim 10, wherein the first collar adjacent one end of the developed lever and the mutually aligned second collar spaced from the first collar are spaced so that a socket extension is disposed between said first and second collars.

19. A device for assisting the loosening of wheel nuts as claimed in claim 10, wherein the developed lever comprises a hollow tube with a smaller diameter tube slidable therein to extend the length of the developed lever to a predetermined maximum length.

* * * * *